(12) United States Patent
Abe et al.

(10) Patent No.: US 8,842,068 B2
(45) Date of Patent: Sep. 23, 2014

(54) DRIVE DEVICE, DISPLAY APPARATUS, AND NON-TRANSITORY COMPUTER READABLE MEDIUM

(75) Inventors: Masaaki Abe, Kanagawa (JP); Yoshinori Machida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 162 days.

(21) Appl. No.: 13/368,007

(22) Filed: Feb. 7, 2012

(65) Prior Publication Data

US 2013/0021384 A1 Jan. 24, 2013

(30) Foreign Application Priority Data

Jul. 21, 2011 (JP) ................... 2011-160013

(51) Int. Cl.
G09G 3/34 (2006.01)
G09G 5/00 (2006.01)

(52) U.S. Cl.
CPC ....................................... *G09G 5/00* (2013.01)
USPC .............. 345/107; 345/84; 345/212; 345/690

(58) Field of Classification Search
CPC .................. G02F 1/167; G02F 1/0121; G02F 2001/1672; G02F 2001/1674; G02F 2001/1678; G02F 2202/36; G09G 3/344; G09G 2310/06; G09G 2320/0252; G09G 5/02; G09G 2310/061; G09G 3/2003; G09G 3/3453; G09G 2320/0247; G09G 3/2081; G09G 5/10; G03G 17/04; G03G 15/321; G01F 1/64; G02B 26/02
USPC ..................... 345/84, 107, 212, 690
See application file for complete search history.

(56) References Cited

U.S. PATENT DOCUMENTS

| 2006/0238488 A1 | 10/2006 | Nihei et al. |
| 2008/0036731 A1 | 2/2008 | Shigehiro et al. |
| 2008/0117165 A1 | 5/2008 | Machida et al. |
| 2008/0303778 A1* | 12/2008 | Machida et al. ............. 345/107 |
| 2010/0225672 A1 | 9/2010 | Verschueren |
| 2012/0170105 A1* | 7/2012 | Abe et al. ..................... 359/296 |

FOREIGN PATENT DOCUMENTS

| JP | 2002-139752 A | 5/2002 |
| JP | 2003-322880 A | 11/2003 |
| JP | 2004163667 A | 6/2004 |
| JP | 2007-249188 A | 9/2007 |
| JP | 2008129179 A | 6/2008 |
| JP | 2010501082 A | 1/2010 |

OTHER PUBLICATIONS

Office Action issued by Japanese Patent Office in corresponding Japanese Patent application No. 2011160013, dated May 7, 2013.

* cited by examiner

*Primary Examiner* — Amare Mengistu
*Assistant Examiner* — Gloryvid Figueroa-Gibson
(74) *Attorney, Agent, or Firm* — Sughrue Mion, PLLC

(57) ABSTRACT

A drive device that drives a display medium displaying an image includes a setting unit that sets a drive voltage of second particles responsive to a display density of the second particles with respect to the image, and sets threshold characteristics of first particles responsive to the set drive voltage of the second particles and a display density of the first particles, and a voltage application unit that applies between a display substrate and a back substrate an initial drive voltage responsive to the threshold characteristics of the first particles set by the setting unit, and thereafter applies between the display substrate and the back substrate the drive voltage of the second particles responsive to the display density of the second particles set by the setting unit.

6 Claims, 8 Drawing Sheets

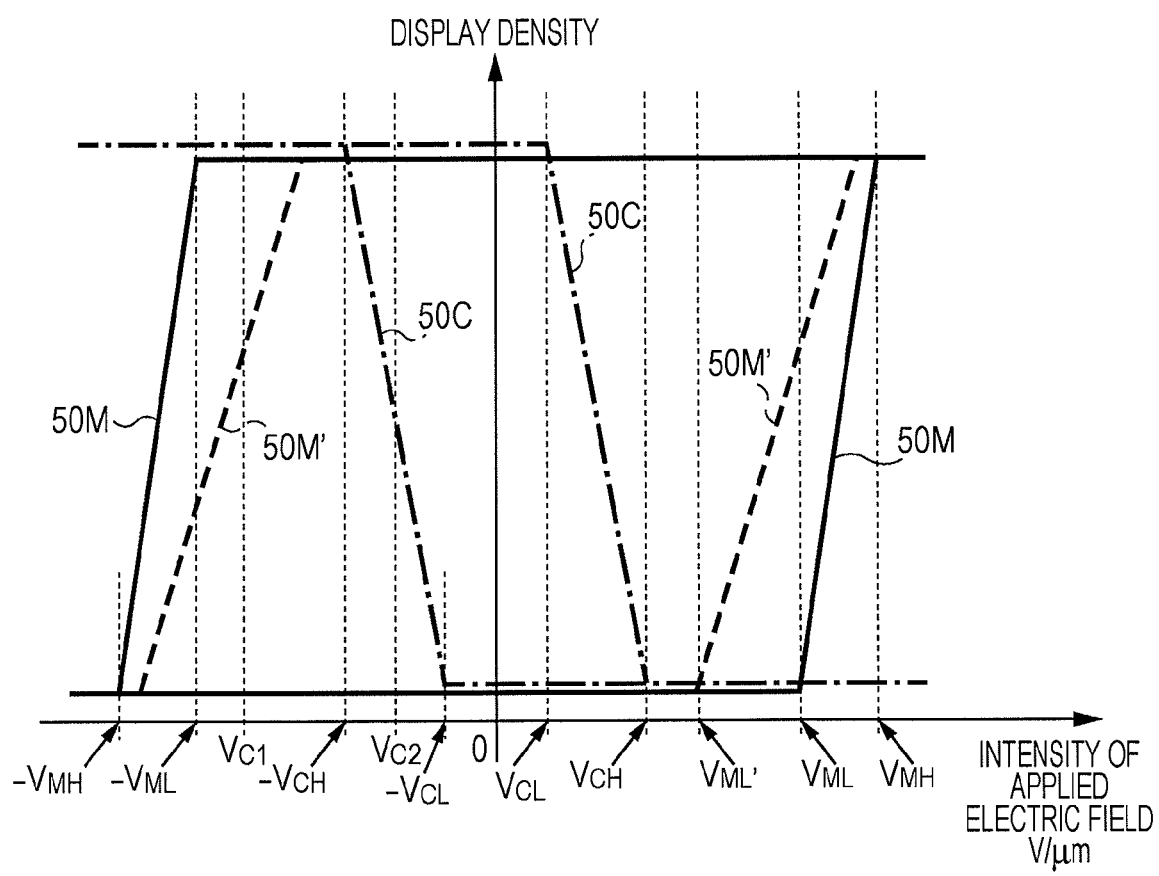

FIG. 7

| C DENSITY | C VOLTAGE | M DENSITY | | | |
|---|---|---|---|---|---|
| | | $V_{thM3}$ | $V_{thM2}$ | $V_{thM1}$ | $V_{thM0}$ |
| $D_{C0}$ | $V_{C0}$ | $D_{M0}$ | $D_{M1}$ | $D_{M2}$ | $D_{M3}$ |
| $D_{C1}$ | $V_{C1}$ | $D_{M0}$ | $D_{M0}$ | $D_{M1.5}$ | $D_{M2}$ |
| $D_{C2}$ | $V_{C2}$ | $D_{M0}$ | $D_{M0}$ | $D_{M0.5}$ | $D_{M1.5}$ |
| $D_{C3}$ | $V_{C3}$ | $D_{M0}$ | $D_{M0}$ | $D_{M0}$ | $D_{M1}$ |

DRIVE DEVICE, DISPLAY APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-160013 filed Jul. 21, 2011.

BACKGROUND (i) Technical Field

The present invention relates to a drive device, a display apparatus, and a computer readable medium.

SUMMARY

According to an aspect of the invention, there is provided a drive device. The drive device drives a display medium which displays an image. The display medium includes a display substrate with transparency to light, a back substrate arranged to be opposed to the display substrate with a separation maintained therebetween, a disperse medium filling between the display substrate and the back substrate, a group of first particles that are dispersed in the disperse medium and move when a first voltage equal to or higher than a first threshold in terms of absolute value is applied between the display substrate and the back substrate, and a group of second particles that are different in color from the first particle group, are dispersed in the disperse medium and move when a voltage equal to or higher than a second threshold in terms of absolute value is applied between the display substrate and the back substrate with the second threshold lower than the first threshold in terms of absolute value. The drive device includes a setting unit that sets a drive voltage of the second particles responsive to a display density of the second particles with respect to the image, and sets threshold characteristics of the first particles responsive to the set drive voltage of the second particles and a display density of the first particles, and a voltage application unit that applies between the display substrate and the back substrate an initial drive voltage responsive to the threshold characteristics of the first particles set by the setting unit, and thereafter applies between the display substrate and the back substrate the drive voltage of the second particles responsive to the display density of the second particles set by the setting unit.

BRIEF DESCRIPTION OF THE DRAWINGS

Exemplary embodiments of the present invention will be described in detail based on the following figures, wherein:

FIG. 2 illustrates threshold characteristics of migrating particles;

FIG. 7 is a table listing a relationship of the threshold characteristics of magenta particles, a density of cyan particles, and applied voltage.

DETAILED DESCRIPTION

Figure 1A:
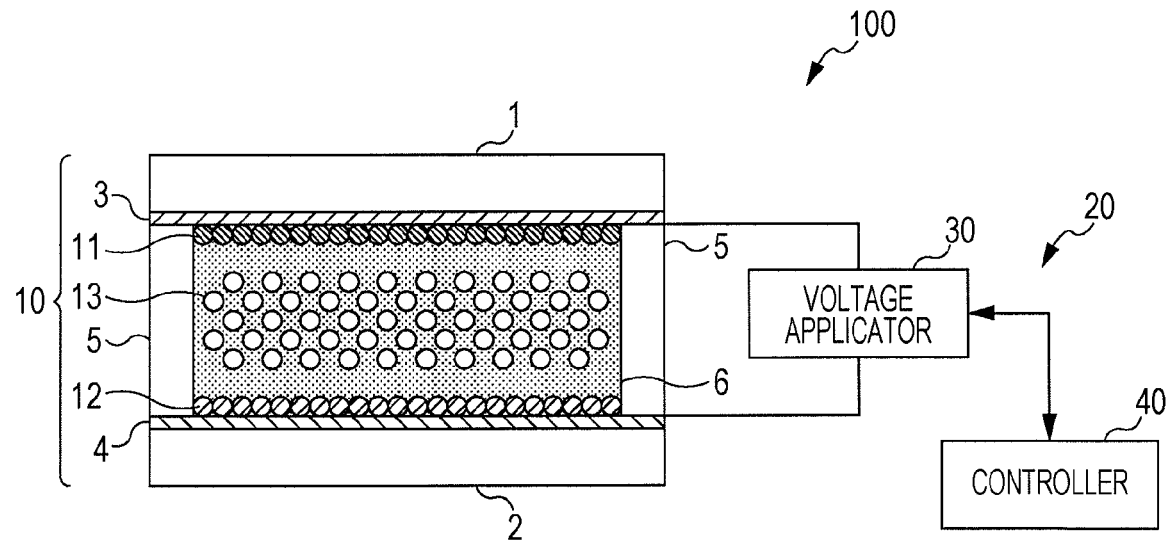
FIG. 1A illustrates a display apparatus and FIG. 1B illustrates a controller of the display apparatus.

The exemplary embodiments of the invention are described with reference to the drawings. Elements having the same operation and function are designated with the same reference numeral throughout the drawings, and the description of the elements may not be repeated. For simplicity of explanation, the exemplary embodiments are described referring to drawings focusing on one cell.

Cyan particles and magenta particles are used herein as an example. Cyan-colored particles are referred to as cyan particles C, magenta-colored particles are referred to as magenta particles M, and yellow-colored particles are referred to as yellow particles Y, and each particle and a particle group of that particle are referred to using the same character (symbol).

FIG. 1A generally illustrates a display apparatus 100 of one exemplary embodiment. The display apparatus 100 includes a display medium 10, and a drive device 20 that drives the display medium 10. The drive device 20 includes a voltage applicator 30 that applies a voltage between a display-side electrode 3 and a back-side electrode 4 of the display medium 10, and a controller 40 that controls the voltage applicator 30 in response to image information of an image to be displayed on the display medium 10.

The display medium 10 includes a display substrate 1 serving as an image display surface and with transparency to light, and a back substrate 2 serving a non-display surface. The display substrate 1 and the back substrate 2 are opposed to each other with a separation maintained therebetween.

A wall member 5 is arranged to maintain a predetermined separation between the display substrate 1 and the back substrate 2 and define a plurality of cells between the display substrate 1 and the back substrate 2.

The cell is a space enclosed by the back substrate 2 having the back-side electrode 4, the display substrate 1 having the display-side electrode 3, and the wall member 5. The cell is filled with a disperse medium 6 of an insulating liquid, and the first particle group 11, the second particle group 12 and a white particle group 13, dispersed in the disperse medium 6.

The first particle group 11 and the second particle group 12 are different from each other in terms of color and charge polarity. By applying a voltage equal to or higher than a threshold value between the pair of electrodes 3 and 4, each particle in the first particle group 11 and in the second particle group 12 migrates individually. On the other hand, the white particle group 13 has a smaller charge amount than each of the first particle group 11 and the second particle group 12. Even if a voltage is applied between the display-side electrode 3 and the back-side electrode 4 such that one of the first particle group 11 and the second particle group 12 migrates to one of the electrodes 3 and 4, the white particle group 13 does not migrate to any of the electrodes 3 and 4.

By mixing a color agent with the disperse medium 6, a white color different from the color of the migrating particles may be displayed.

The drive device 20 (the voltage applicator 30 and the controller 40) causes the first particle group 11 and the second particle group 12 to migrate by applying a voltage corresponding to a color to be displayed between the display-side electrode 3 and the back-side electrode 4 of the display medium 10. The drive device 20 thus causes each of the first particle group 11 and the second particle group 12 to be attracted to one of the display substrate 1 and the back substrate 2 in accordance with the charge polarity of the particles.

The voltage applicator 30 is electrically connected to each of the display-side electrode 3 and the back-side electrode 4. The voltage applicator 30 is also connected to the controller 40 to exchange signals.

Figure 1B:
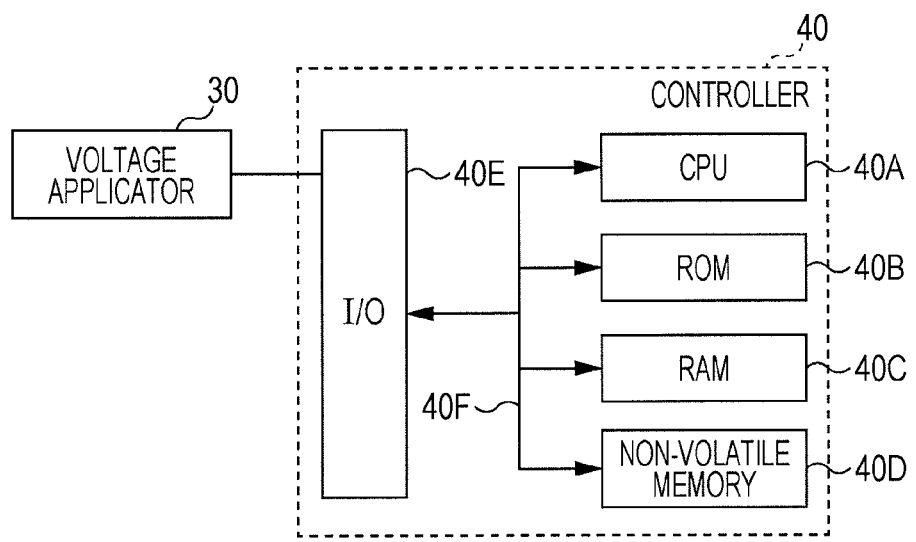

As illustrated in FIG. 1B, the controller 40 may be implemented as a computer 40. The computer 40 includes central processing unit (CPU) 40A, read-only memory (ROM) 40B, random-access memory (RAM) 40C, non-volatile memory 40D, input-output (I/O) interface 40E, and bus 40F interconnecting those elements. The voltage applicator 30 is connected to the input-output interface 40E. The non-volatile memory 40D may store a program that causes the computer 40 to instruct the voltage applicator 30 to apply a voltage for displaying each color. The CPU 40A then reads the program for execution. The program may be supplied using a recording medium such as a CD-ROM, or the like.

The voltage applicator 30 serves as a voltage application unit that applies a voltage to the display-side electrode 3 and the back-side electrode 4. The voltage applicator 30 applies a voltage under the control of the controller 40 to the display-side electrode 3 and the back-side electrode 4.

According to the exemplary embodiment, the back-side electrode 4 is grounded, and the display-side electrode 3 is supplied with a voltage.

FIG. 2 illustrates a relationship (threshold characteristics) between an electric field intensity (V/μm) and a display density of each particle group when the display-side electrode 3 is supplied with a voltage with the back-side electrode 4 grounded. The term "display density" is intended to mean the degree of concentration of particles on the display substrate. A high display density means a large amount of particles on the display substrate, thus being displayed in a deep color tone. A low display density means a small amount of particles on the display substrate, being displayed in a light color tone. In FIG. 2, the threshold characteristics of the cyan particles C are denoted by 50C, and the threshold characteristics of the magenta particles M are denoted by 50M. In the exemplary embodiment, the magenta particles M are negatively charged, and the cyan particles C are positively charged.

As illustrated in FIG. 2, let $+V_{ML}$ represent an electric field intensity (threshold electric field intensity) at which negatively charged magenta particles M on the back substrate 2 start moving toward the display substrate 1 and let $+V_{MH}$ represent an electric field intensity (threshold electric field intensity) at which all the magenta particles M have moved to the display substrate 1. Let $-V_{ML}$ represent an electric field intensity (threshold electric field intensity) at which negatively charged magenta particles M on the display substrate 1 start moving toward the back substrate 2 and let $-V_{MH}$ represent an electric field intensity (threshold electric field intensity) at which all the magenta particles M have moved to the back substrate 2.

With an electric field having an intensity of $+V_{ML}$ or higher applied between the substrates, the magenta particles M on the back substrate 2 start moving toward the display substrate 1, and with an electric field having an intensity of $+V_{MH}$ or higher applied between the substrates, all the magenta particles M have moved to the display substrate 1. With an electric field having an intensity of $-V_{ML}$ or lower applied between the substrates, the magenta particles M on the display substrate 1 start moving toward the back substrate 2, and with an electric field having an intensity of $-V_{MH}$ or lower applied between the substrates, all the magenta particles M have moved to the back substrate 2.

Let $-V_{CL}$ represent an electric field intensity (threshold electric field intensity) at which cyan particles C on the back substrate 2 start moving toward the display substrate 1 and let $-V_{CH}$ represent an electric field intensity (threshold electric field intensity) at which all the cyan particles C have moved to the display substrate 1. Let $+V_{CL}$ represent an electric field intensity (threshold electric field intensity) at which cyan particles C on the display substrate 1 start moving toward the back substrate 2 and let $+V_{CH}$ represent an electric field intensity (threshold electric field intensity) at which all the cyan particles C have moved to the back substrate 2.

With an electric field having an intensity of $-V_{CL}$ or lower applied between the substrates, the cyan particles C on the back substrate 2 start moving toward the display substrate 1, and with an electric field having an intensity of $-V_{CH}$ or lower applied between the substrates, all the magenta particles M have moved to the display substrate 1. With an electric field having an intensity of $+V_{CL}$ or higher applied between the substrates, the cyan particles C on the display substrate 1 start moving toward the back substrate 2, and with an electric field having an intensity of $+V_{CL}$ or higher applied between the substrates, all the cyan particles C have moved to the back substrate 2.

Figure 3:
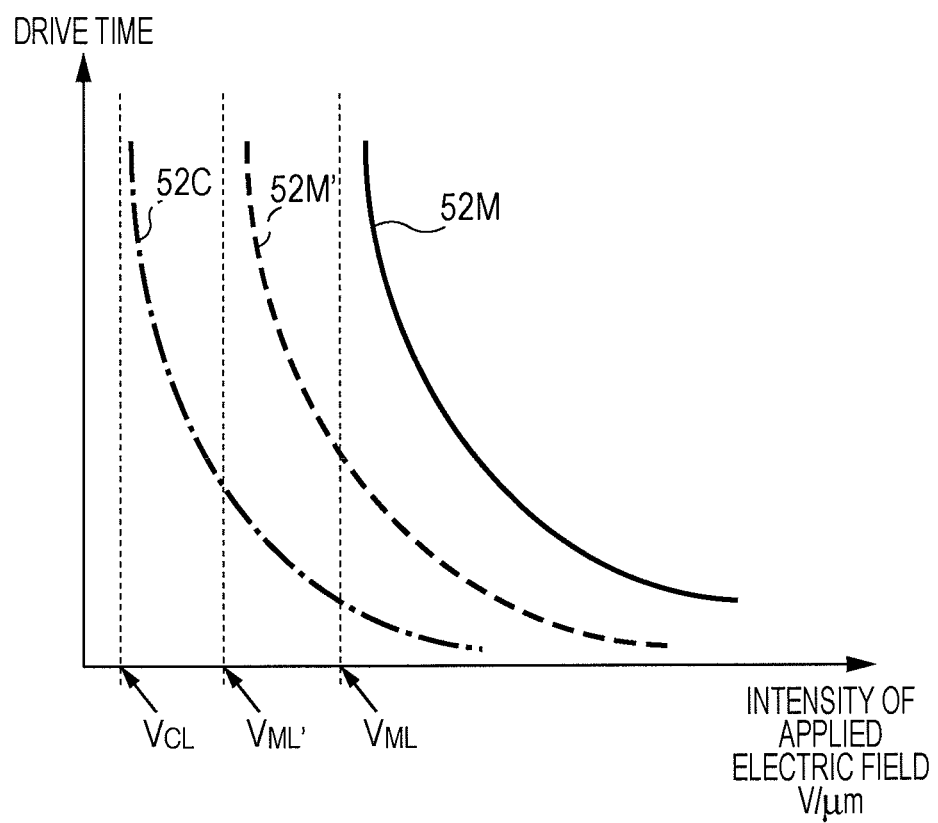
FIG. 3 illustrates curves representing a relationship between an electric field intensity and drive time.

FIG. 3 illustrates the relationship between the electric field intensity and drive time of the particles (movement time of the particles). As illustrated in FIG. 3, a curve 52M represents the relationship between the electric field intensity of the magenta particles M and the drive time of the magenta particles M, and a curve 52C represents the relationship between the electric field intensity of the cyan particles C and the drive time of the cyan particles C. As illustrated in FIG. 3, the higher the intensity of electric field is applied between the substrates, the shorter the drive time is. The lower the threshold electric field intensity the particles have, the shorter the drive time is.

Figure 4:
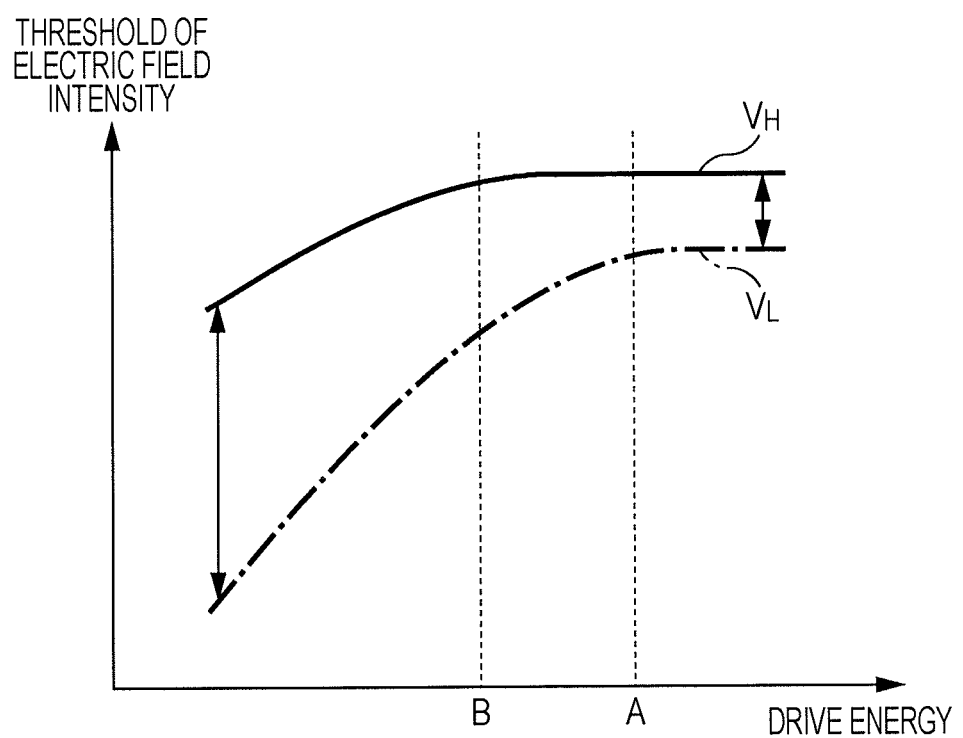
FIG. 4 illustrates curves representing a relationship between drive energy and a threshold value of electric field intensity.

As illustrated in FIG. 4, let $V_L$ represent the absolute value of the electric field intensity at which the particles start moving from one substrate to the other, and let $V_H$ represent the absolute value of the electric field intensity at which all the particles have moved from the one substrate to the other substrate. The threshold electric field intensity varies depending on drive energy moving the particles. The lower the drive energy becomes, the lower the threshold electric field intensity becomes. The threshold characteristics of the magenta particles M may now be the threshold characteristics 50M in FIG. 2 determined by the drive energy at A in FIG. 4. The drive energy may now be changed to B as illustrated in FIG. 4 by shortening the voltage application time with the voltage value fixed. The drive energy B is lower than the drive energy A. The threshold characteristics change from 50M to 50M' as illustrated in FIG. 2. The curve representing the relationship between the electric field intensity of the magenta particles M and the drive time of the magenta particles M becomes 52M' as illustrated in FIG. 3.

Figure 5:
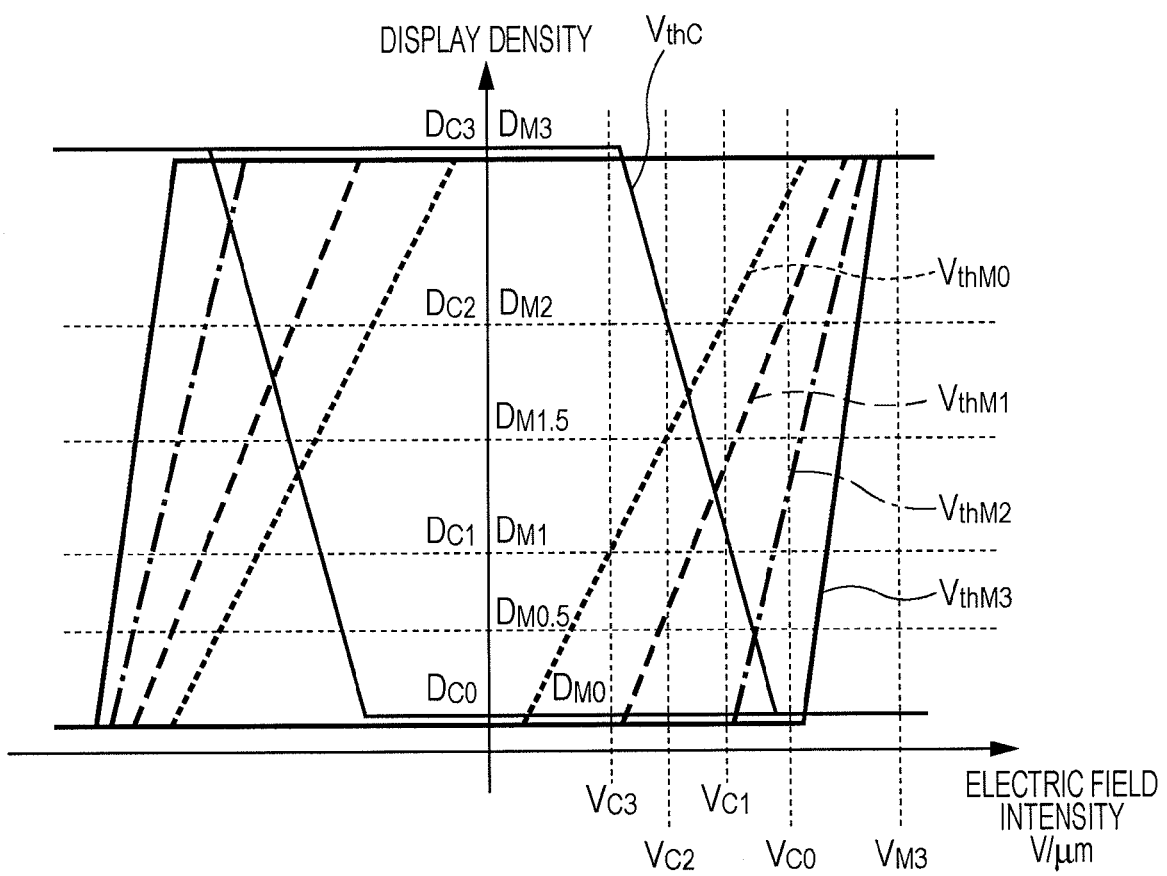
FIG. 5 illustrates threshold characteristics of the migrating particle.

FIG. 5 illustrates threshold characteristics that are changed in four levels when the magenta particles M are moved by changing the voltage application time with the value of the applied voltage fixed. In FIG. 5, the threshold characteristics of the magenta particles M are represented by $V_{thM3}$, $V_{thM2}$, $V_{thM1}$, and $V_{thM0}$, and the threshold characteristics of the cyan particles C are represented by $V_{thC}$.

Figure 6:
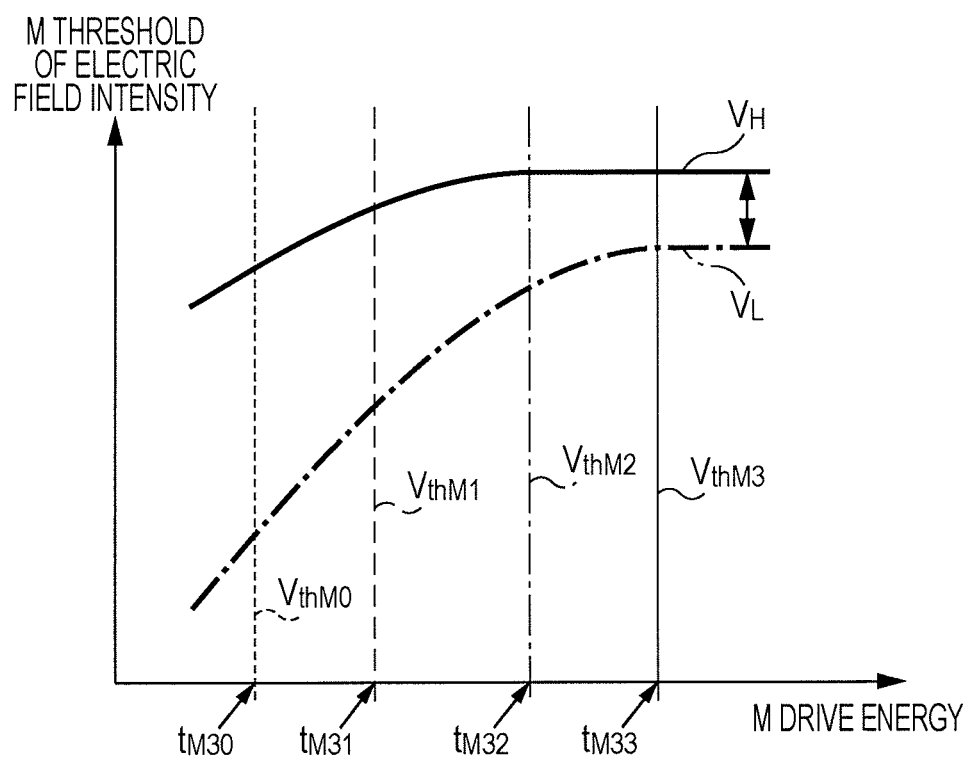
FIG. 6 illustrates curves representing a relationship between drive energy and the threshold value of the electric field intensity.

FIG. 6 illustrates the relationship of the threshold characteristics of the magenta particles M, $V_{thM3}$, $V_{thM2}$, $V_{thM1}$, and $V_{thM0}$ and the threshold characteristics of the cyan particles C, $V_{thC}$. The drive energy is the voltage application time when a voltage of a voltage value $V_{M3}$ is applied to the display-side electrode 3.

As illustrated in FIG. 6, the threshold characteristics $V_{thM3}$ result from applying a voltage having a voltage value $V_{M3}$ and a voltage application time $t_{M33}$ to the display-side electrode 3. The threshold characteristics $V_{thM2}$ result from applying a voltage having a voltage value $V_{M3}$ and a voltage application time $t_{M32}$ to the display-side electrode 3. The threshold characteristics $V_{thM1}$ result from applying a voltage having a voltage value $V_{M3}$ and a voltage application time $t_{M31}$ to the display-side electrode 3. The threshold characteristics $V_{thM0}$ result from applying a voltage having a voltage value $V_{M3}$ and a voltage application time $t_{M30}$ to the display-side electrode 3. As illustrated in FIG. 6, the relationship of $t_{M33} > t_{M32} > t_{M31} > T_{M30}$ holds.

FIG. 7 is a table listing the relationship of densities of the cyan particles C $D_{C0}$-$D_{C3}$ (C density), voltages to be applied to the display-side electrode 3 (C voltage) to result in C densities $D_{C0}$-$D_{C3}$, and densities of the magenta particles M $D_{M0}$-$D_{M3}$ (M density) at each of the threshold characteristics of the magenta particles M of $V_{thM3}$, $V_{thM2}$, $V_{thM1}$, and $V_{thM0}$.

As illustrated in FIG. 5, the threshold characteristics $V_{thC}$ of the cyan particles C cross the threshold characteristics of the magenta particles of $V_{thM2}$, $V_{thM1}$, and $V_{thM0}$. If the threshold characteristics of the magenta particles M are one of $V_{thM2}$, $V_{thM1}$, and $V_{thM0}$ as illustrated in FIG. 7, a change in the C voltage, i.e., a change in the C density, causes the density of the magenta particles M to change accordingly.

The threshold characteristics of the magenta particles M are set in response to the density of the cyan particles C and the density of the magenta particles M to be displayed, and the cyan particles C and the magenta particles M are driven concurrently. The drive time is shorter than when the cyan particles C and the magenta particles M are separately driven.

As denoted by a dash-dot-lined box and a broken-lined box in FIG. 7, the threshold characteristics $V_{thM0}$ are simply selected if the density of the cyan particles C to be displayed is $D_{C1}$ and if the density of the magenta particles M to be displayed is $D_{M2}$. In this way, the cyan particles C and the magenta particles M are concurrently driven, causing the density of the cyan particles C to be $D_{C1}$ and the density of the magenta particles M to be $D_{M2}$.

Figure 8:
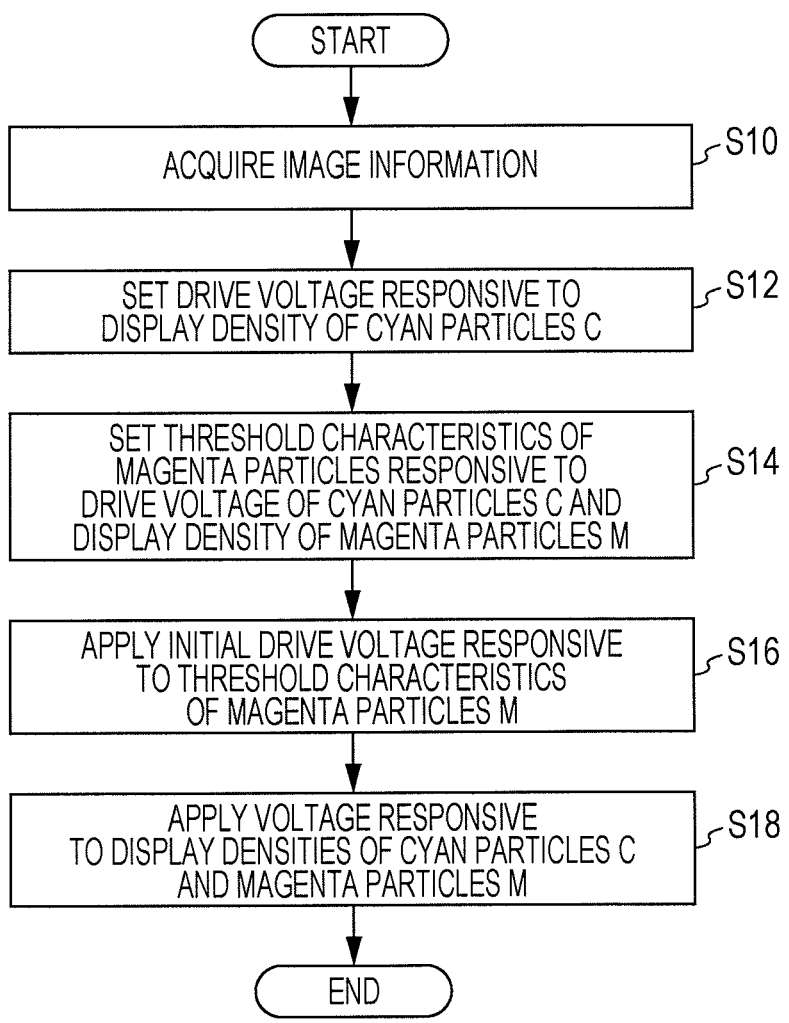
FIG. 8 is a flowchart illustrating a process performed by the controller.

A control process executed by the CPU 40A in the controller 40 is described with reference to a flowchart of FIG. 8.

In step S10, image information of an image to be displayed on the display apparatus 100 is received from an external apparatus via the input-output interface 40E.

A C voltage of the cyan particles C corresponding to the display density of the cyan particles C is set in step S12. If the density of the cyan particles C to be displayed is $D_{C1}$, a C voltage $V_{c1}$ is set as illustrated in FIG. 7.

In step S14, the threshold characteristics are set such that the magenta particles M result in a desired display density with the C voltage of the cyan particles C applied. For example, the threshold characteristics $V_{thM0}$ of the magenta particles M are set as illustrated in FIG. 7 if the density of the cyan particles C to be displayed is $D_{C1}$, the C voltage to be supplied is $V_{C1}$, and the density of the magenta particles M desired is $D_{M2}$.

In step S16, an initial drive voltage satisfying the threshold characteristics set in step S14 is applied to the display-side electrode 3. More specifically, if the threshold characteristics $V_{thM0}$ are set, the voltage applicator 30 is set such that the voltage having the voltage value $V_{M3}$ and the voltage application time $t_{M30}$ is applied to the display-side electrode 3. And then, all the magenta particles M move to the back substrate 2 while all the cyan particles C move to the display substrate 1. The threshold characteristics of the magenta particles M become $V_{thM0}$.

In step S18, the display-side electrode 3 is supplied with a voltage corresponding to the display density of the cyan particles C and the display density of the magenta particles M. If the display density of the cyan particles C is $D_{C1}$, the voltage applicator 30 is set such that the voltage $V_{C1}$ is supplied to the display-side electrode 3 as illustrated in FIGS. 5 and 7. The cyan particles C and the magenta particles M are concurrently driven. The display density of the cyan particles C become $D_{C1}$. The display density of the magenta particles M driven in accordance with the threshold characteristics $V_{thM0}$ become $D_{M2}$.

According to the exemplary embodiment, the threshold characteristics of the magenta particles M are set in response to the density of the cyan particles C to be displayed and the density of the magenta particles M to be displayed. After the initial drive voltage matching the set threshold characteristics is applied to the display-side electrode 3, the voltage responsive to the display densities of the cyan particles C and the magenta particles M is applied to the display-side electrode 3. The cyan particles C and the magenta particles M are thus concurrently driven. The process of the exemplary embodiment is simpler by one drive step than when the cyan particles C and the magenta particles M are driven separately. The drive time is thus shortened.

According to the exemplary embodiment, the threshold characteristics of the magenta particles M are modified by changing the voltage application time with the voltage value fixed. Alternatively, the threshold characteristics of the magenta particles M may be modified by changing the voltage value with the voltage application time fixed.

The colors of the particles may be different from those described above. The colors may be selected in a variety of combinations (including black and white, yellow and magenta, and yellow and cyan, for example). According to the exemplary embodiment, the particle groups are two types of the magenta particles M and the cyan particles C. The types of particles may be three or more. For example, the present invention is applicable if the particle types include the magenta particles M, the cyan particles C, and yellow particles Y.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A drive device that drives a display medium which displays an image, the display medium including a display substrate with transparency to light, a back substrate arranged to be opposed to the display substrate with a separation maintained therebetween, a disperse medium filling between the display substrate and the back substrate, a group of first particles that are dispersed in the disperse medium and move when a first voltage equal to or higher than a first threshold in terms of absolute value is applied between the display substrate and the back substrate, and a group of second particles that are different in color from the first particles, are dispersed in the disperse medium and move when a voltage equal to or higher than a second threshold in terms of absolute value is applied between the display substrate and the back substrate with the second threshold lower than the first threshold in terms of absolute value, the drive device comprising:
a setting unit that sets a drive voltage of the second particles responsive to a display density of the second particles with respect to the image, and sets threshold characteristics of the first particles based on a relationship between the set drive voltage of the second particles and a display density of the first particles; and
a voltage application unit that applies between the display substrate and the back substrate an initial drive voltage responsive to the threshold characteristics of the first particles set by the setting unit, and thereafter applies between the display substrate and the back substrate the drive voltage of the second particles responsive to the display density of the second particles set by the setting unit.

2. The drive device according to claim 1, wherein the setting unit sets the threshold characteristics of the first particles by selecting the threshold characteristics of the first particles from among a plurality of threshold characteristics of the first particles based on the set drive voltage of the second particles and the display density of the first particles.

3. The drive device according to claim 1, wherein in response to the voltage application unit applying the drive voltage of the second particles, the first particles and the second particles move.

4. The drive device according to claim 1, wherein a voltage value of the set drive voltage of the second particles is a factor that is used to set the threshold characteristics of the first particles.

5. A display apparatus, comprising:
a display medium displaying an image and including a display substrate with transparency to light, a back substrate arranged to be opposed to the display substrate with a separation maintained therebetween, a disperse medium filling between the display substrate and the back substrate, a group of first particles that are dispersed in the disperse medium and move when a first voltage equal to or higher than a first threshold in terms of absolute value is applied between the display substrate and the back substrate, and a group of second particles that are different in color from the first particles, are dispersed in the disperse medium and move when a voltage equal to or higher than a second threshold in terms of absolute value is applied between the display substrate and the back substrate with the second threshold lower than the first threshold in terms of absolute value; and
a drive device that drives the display medium, the drive device including a setting unit that sets a drive voltage of the second particles responsive to a display density of the second particles with respect to the image, and sets threshold characteristics of the first particles based on a relationship between the set drive voltage of the second particles and a display density of the first particles, and a voltage application unit that applies between the display substrate and the back substrate an initial drive voltage responsive to the threshold characteristics of the first particles set by the setting unit, and thereafter applies between the display substrate and the back substrate the drive voltage of the second particles responsive to the display density of the second particles set by the setting unit.

6. A non-transitory computer readable medium storing a program causing a computer to execute a process for driving a display medium which displays an image, the display medium including a display substrate with transparency to light, a back substrate arranged to be opposed to the display substrate with a separation maintained therebetween, a disperse medium filling between the display substrate and the back substrate, a group of first particles that are dispersed in the disperse medium and move when a first voltage equal to or higher than a first threshold in terms of absolute value is applied between the display substrate and the back substrate, and a group of second particles that are different in color from the first particles, are dispersed in the disperse medium and move when a voltage equal to or higher than a second threshold in terms of absolute value is applied between the display substrate and the back substrate with the second threshold lower than the first threshold in terms of absolute value, the process comprising:
setting a drive voltage of the second particles responsive to a display density of the second particles with respect to the image, and setting threshold characteristics of the first particles based on a relationship between the set drive voltage of the second particles and a display density of the first particles; and
applying between the display substrate and the back substrate an initial drive voltage responsive to the set threshold characteristics of the first particles, and thereafter applying between the display substrate and the back substrate the drive voltage of the second particles responsive to the set display density of the second particles.

\* \* \* \* \*